(12) United States Patent
Sepe (10) Patent No.: US 9,750,959 B2
(45) Date of Patent: Sep. 5, 2017

(54) CABLE GRAB DEVICE

(71) Applicant: MSA Technology, LLC, Cranberry Township, PA (US)

(72) Inventor: Benjamin T. Sepe, Pittsburgh, PA (US)

(73) Assignee: MSA Technology, LLC, Cranberry Township, PA (US)

(*) Notice: Subject to any disclaimer, the term of this patent is extended or adjusted under 35 U.S.C. 154(b) by 68 days.

(21) Appl. No.: 14/919,501

(22) Filed: Oct. 21, 2015

(65) Prior Publication Data

US 2017/0113072 A1    Apr. 27, 2017

(51) Int. Cl.
| | | |
|---|---|---|
| A62B 1/14 | (2006.01) | |
| F16D 63/00 | (2006.01) | |
| A62B 35/00 | (2006.01) | |
| E06C 7/18 | (2006.01) | |
| F16G 11/10 | (2006.01) | |

(52) U.S. Cl.
CPC ............ *A62B 1/14* (2013.01); *A62B 35/0081* (2013.01); *F16D 63/008* (2013.01); *A62B 35/0093* (2013.01); *E06C 7/186* (2013.01); *F16G 11/101* (2013.01); *F16G 11/105* (2013.01); *F16G 11/106* (2013.01)

(58) Field of Classification Search
CPC ..... A62B 1/14; A62B 35/0093; F16G 11/101; F16G 11/105; F16G 11/106
USPC .............................. 182/192, 5; 188/65.1, 65.2
See application file for complete search history.

(56) References Cited

U.S. PATENT DOCUMENTS

| | | | | |
|---|---|---|---|---|
| 3,386,530 A | * | 6/1968 | Thompson | B66B 5/24 182/112 |
| 3,492,702 A | * | 2/1970 | Stafford | F16G 11/101 182/5 |
| 3,811,155 A | * | 5/1974 | Stafford | A62B 1/14 182/5 |
| 3,852,943 A | * | 12/1974 | Healy | A62B 1/14 16/257 |
| 4,034,828 A | * | 7/1977 | Rose | A62B 1/14 182/5 |
| 4,254,941 A | * | 3/1981 | Tanson | B66D 5/16 188/188 |

(Continued)

FOREIGN PATENT DOCUMENTS

| | | |
|---|---|---|
| DE | 3510602 A1 | 9/1986 |
| FR | 2686962 A3 | 8/1993 |
| FR | 2970183 A1 | 7/2012 |

*Primary Examiner* — Thomas Irvin
(74) *Attorney, Agent, or Firm* — The Webb Law Firm (57) ABSTRACT

A fall protection device or cable grab device for use with a generally vertically-extending cable, comprising: an articulating frame comprising: (i) a plurality of members; (ii) a channel configured to receive and retain the cable; and (iii) an attachment member opening extending through at least a portion of the articulating frame and configured to facilitate attachment of an attachment member to the cable grab device; wherein, when the frame is articulated in a generally downward (or first) direction, and at a specified point, at least a portion of at least one of the plurality of members contacts the cable and brakes movement of the cable grab device; wherein, when the frame is articulated in a generally upward (or second) direction, and at a specified point, at least a portion of at least one of the plurality of members contacts the cable and brakes movement of the cable grab device.

20 Claims, 10 Drawing Sheets

(56) References Cited

U.S. PATENT DOCUMENTS

| | | | | |
|---|---|---|---|---|
| 4,542,884 | A | * | 9/1985 | Dodge, Jr. ............... A62B 1/14 182/5 |
| 4,846,075 | A | * | 7/1989 | Tupper ..................... A62B 1/14 104/204 |
| 5,133,111 | A | * | 7/1992 | Brown .................. F16G 11/106 24/132 WL |
| 5,156,240 | A | * | 10/1992 | Ostrobrod ................ A62B 1/14 182/193 |
| 5,735,507 | A | * | 4/1998 | Sierra Escudero ..... B66C 15/02 254/391 |
| 5,855,251 | A | * | 1/1999 | Deuer ..................... A62B 1/14 182/192 |
| 5,860,493 | A | * | 1/1999 | Cherpitel ................. A62B 1/14 182/193 |
| 6,009,977 | A | * | 1/2000 | Pelofi ...................... A62B 1/14 182/192 |
| 6,793,046 | B2 | * | 9/2004 | Petzl ....................... A62B 35/04 188/188 |
| 6,942,070 | B2 | * | 9/2005 | Ramseier ................ B66C 15/02 182/142 |
| 7,845,467 | B2 | * | 12/2010 | Petzl ........................ A62B 1/14 182/193 |
| D633,783 | S | * | 3/2011 | Iwama .......................... D8/383 |
| D633,784 | S | * | 3/2011 | Iwama .......................... D8/383 |
| 8,225,905 | B2 | * | 7/2012 | Delaittre .................. A62B 1/14 182/190 |
| 9,168,402 | B2 | * | 10/2015 | Casebolt ............ A62B 35/0081 |
| 2002/0014370 | A1 | * | 2/2002 | Casebolt .................. A62B 1/14 182/5 |
| 2007/0119653 | A1 | * | 5/2007 | Brown ..................... A62B 1/14 182/36 |

* cited by examiner

CABLE GRAB DEVICE

BACKGROUND OF THE INVENTION

Field of the Invention

The present invention relates generally to fall protection safety devices and, in particular, to a cable grab device for use in connection with a generally vertically-extending cable or line, such as a cable that runs along a ladder or cage on the side of a structure.

Description of Related Art

There are many structures and buildings, e.g., skyscrapers, towers, bridges, cell-phone towers, tall industrial buildings, antenna structures, and the like, that require maintenance or access thereto from the bottom area to the top area. In order to provide access to the various areas or floors of such structures or buildings, a ladder will be constructed and attached to the side of the structure or building. Typically, this ladder will be surrounded by a cage to ensure that maintenance or other persons traversing the ladder will not fall if they lean backward too far and lose their grip. To provide further safety measures, a cable may be positioned adjacent the ladder and within the cage, where the cable extends from the bottom to the top of the ladder. In use, the person will attach a fall protection device (sometimes referred to as a "cable grab") to the cable, and will connect an attachment member, such as a carabiner, to the device with a line attached between the carabiner and a connection point on the person (e.g., a connection point on a lanyard, belt, harness, and the like). This fall protection device will allow free movement as the person climbs up or down the ladder. However, if the movement in the downward direction is too fast, the fall protection device will operate to grip or contact the cable and brake or stop movement in the downward direction, thereby protecting the person from falling down through the cage.

Figures 1, 2:
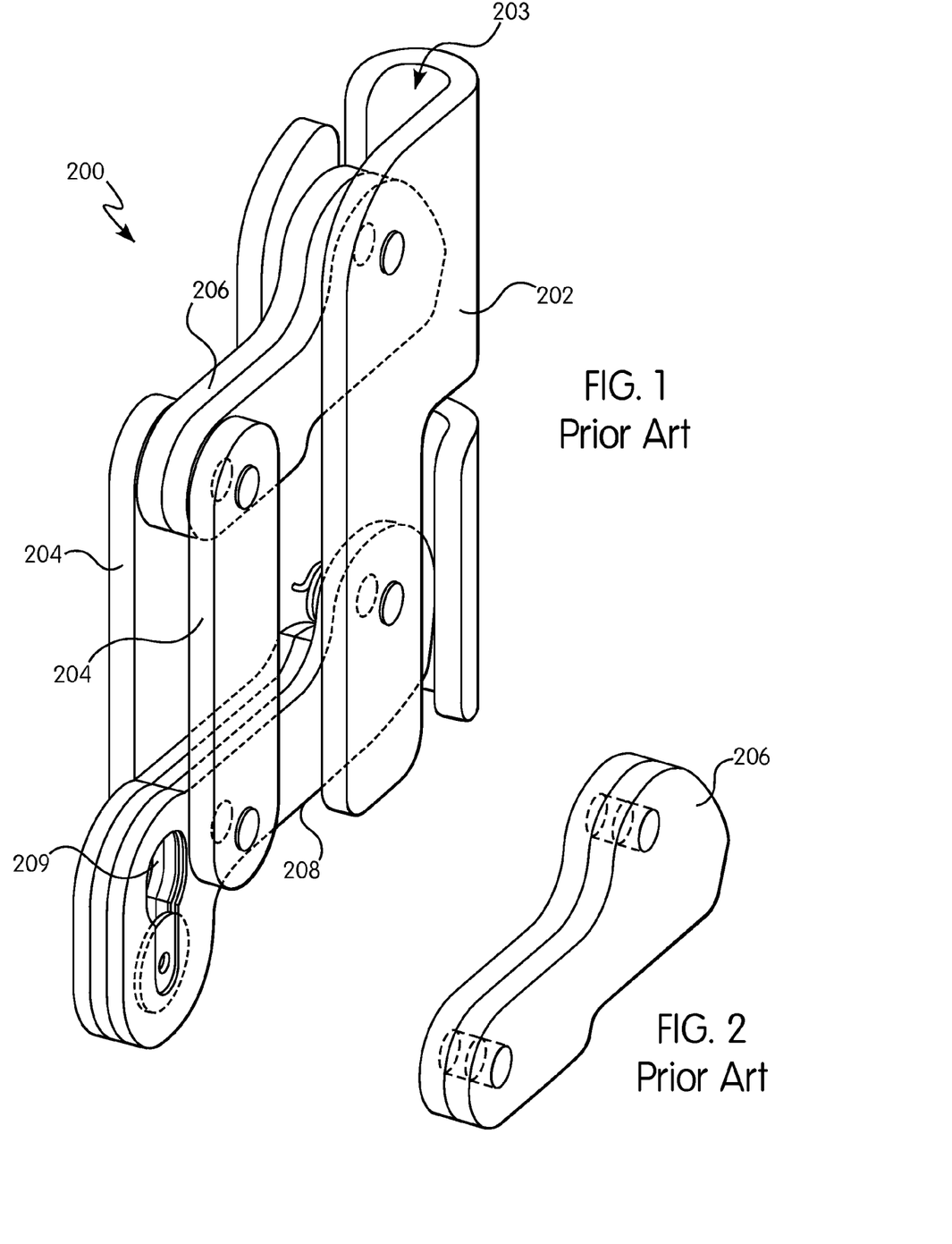
FIG. 1 is perspective view of a cable grab device according to the prior art.
FIG. 2 is a perspective view of a portion of the cable grab device of FIG. 1.
Figures 3, 4:
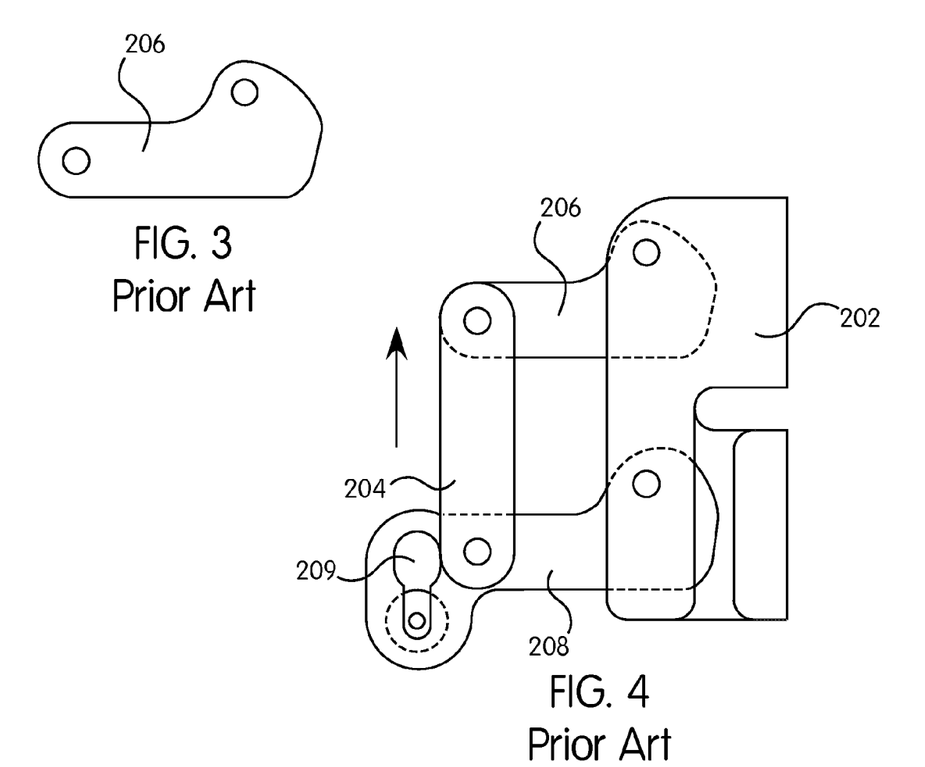
FIG. 3 is a side view of a portion of the cable grab device of FIG. 1.
FIG. 4 is a first side view of the cable grab device of FIG. 1.
Figure 5:
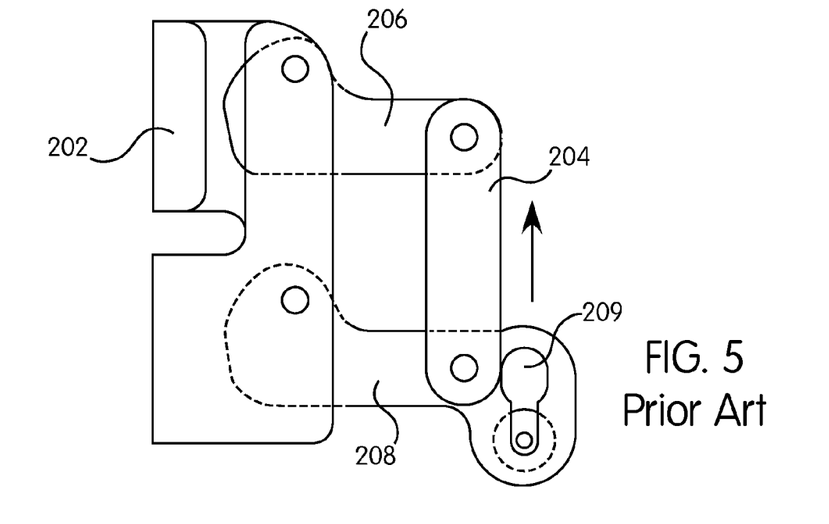
FIG. 5 is a second side view of the cable grab device of FIG. 1.
Figure 6:
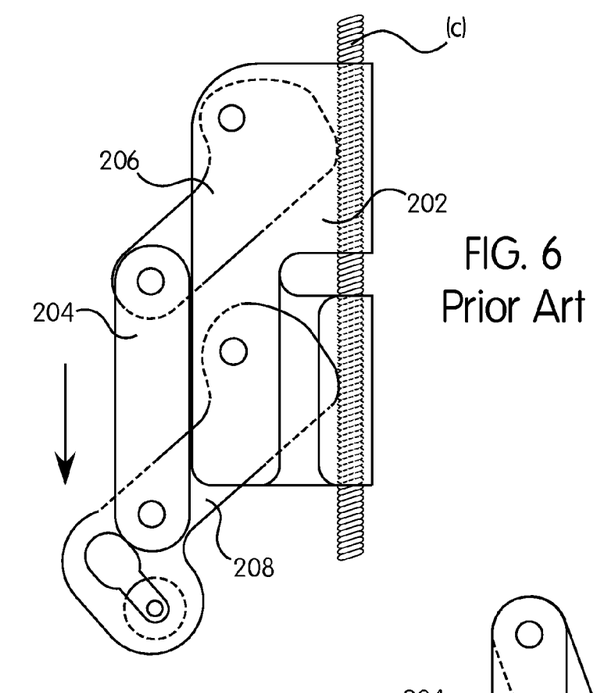
FIG. 6 is a side view of the cable grab device of FIG. 1 during movement or urging in a first direction.

As is known in the art, and as illustrated in FIGS. 1-7 in various orientations and modes of operation, a known cable grab device 200 includes a first lateral member 202 having a channel 203 configured to receive and retain a cable (C), a second lateral member 204 spaced from the first lateral member 202, a first pivot member 206 pivotally attached between a first end of the first lateral member 202 and a first end of the second lateral member 204, and a second pivot member 208 pivotally attached between a second end of the first lateral member 202 and a second end of the second lateral member 204. An attachment member opening 209 extends through the second lateral member 204, and an attachment member (not shown, e.g., a carabiner or the like) can be removably attached through the attachment member opening 208. With reference to FIG. 6, and when the cable grab device 200 is moved or urged in a generally downward direction, and at a specified point, the first end of the first pivot member 206 and the first end of the second pivot member 208 contacts and/or bears against the cable (C), which brakes or stops the movement of the cable grab device 200 in the downward direction. In this manner, if the maintenance person falls down through the cage, the cable grab device 200 will brake and stop its downward movement, which will arrest the fall of the person via attachment between the cable grab device 200, the attachment member, and the person (or device or arrangement worn by the person).

Figure 7:
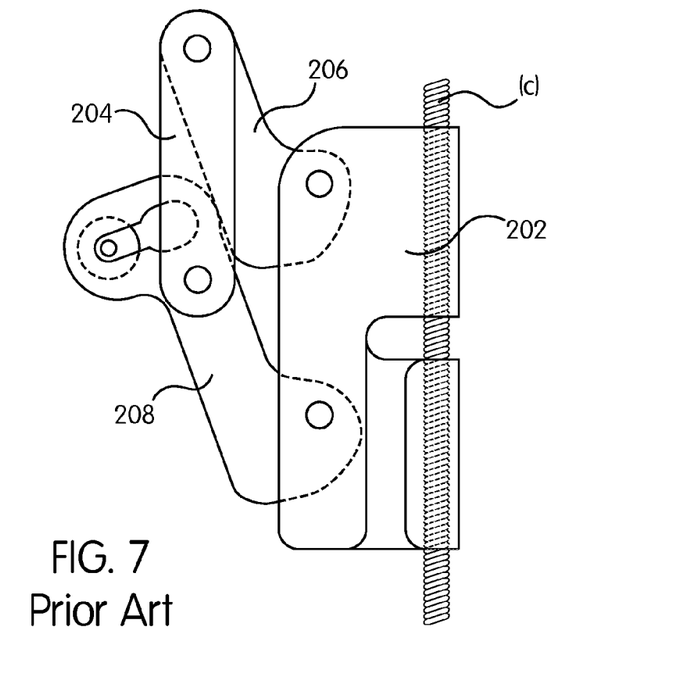
FIG. 7 is a side view of the cable grab device of FIG. 1 during movement or urging in a second direction.

One drawback with respect to this existing cable grab device 200 is that, due to its proximity to the user, the person's first instinct when falling may be to grab the cable grab device 200. If the person grabs the cable grab device 200 and forces it to close or articulate in the downward direction (as intended), then the cable grab device 200 will still operate effectively, contact the cable (C), and arrest the person's fall (again, as illustrated in FIG. 6). However, and as illustrated in FIG. 7, if the person grabs the cable grab device 200 and forces it to articulate in the upward direction, then the cable grab device 200 cannot contact the cable (C) and cannot arrest the person's fall.

Accordingly, there is a need in the art for an improved cable grab device. There is also a need in the art for a fall protection device that provides a fall arrest operation regardless of how the device is closed or articulated.

SUMMARY OF THE INVENTION

Generally, provided is an improved fall protection device, and preferably, an improved cable grab device. Preferably, provided is a cable grab device that is operable to close or articulate and arrest the fall of a person regardless of how the device is closed or articulated.

In one preferred and non-limiting embodiment or aspect, provided is a fall protection device for use with a generally vertically-extending cable comprising: at least one first lateral member having a channel configured to receive and retain the cable; at least one second lateral member spaced from the at least one first lateral member; at least one first pivot member pivotally attached between a first end of the at least one first lateral member and a first end of the at least one second lateral member; at least one second pivot member pivotally attached between a second end of the at least one first lateral member and a second end of the at least one second lateral member; and an attachment member opening extending through at least a portion of at least one of the following: the at least one second lateral member, the at least one first pivot member, the at least one second pivot member, or any combination thereof, wherein the attachment member opening is configured to facilitate attachment of an attachment member to the fall protection device; wherein, when the fall protection device is moved or urged in a generally downward direction, and at a specified point, at least a portion of a first end of the at least one first pivot member and/or a first end of the at least one second pivot member contacts the cable and brakes or stops movement of the fall protection device; wherein at least one slot extends through at least a portion of the first end of the at least one first pivot member and/or the first end of the at least one second pivot member, such that if the at least one second lateral member is urged or moved in a generally upward direction with respect to the at least one first lateral member, and at a specified point, at least a portion of the first end of the at least one first pivot member and/or the first end of the at least one second pivot member contacts the cable and brakes or stops movement of the fall protection device.

In one preferred and non-limiting embodiment or aspect, at least one biasing member is configured to bias or urge the at least one second lateral member in one direction. In another preferred and non-limiting embodiment or aspect, the at least one biasing member is a spring.

In one preferred and non-limiting embodiment or aspect, the at least one first lateral member comprises a substantially U-shaped cross section, wherein a bottom area of the U-shape defines the channel and a top area of the U-shape is configured to receive at least a portion of the first end of the at least one first pivot member and at least a portion of the first end of the at least one second pivot member therebetween. In another preferred and non-limiting embodiment or aspect, a shaped slot is located in the bottom area of the U-shape, such that the fall protection device is removably connectable to the cable by first moving the shaped slot over the cable and twisting the fall protection device to seat the cable in the channel. In another preferred and non-limiting embodiment or aspect, a generally S-shaped slot having a first linear portion, a transverse portion, and a second linear portion is provided.

In one preferred and non-limiting embodiment or aspect, the attachment member opening is shaped. In another preferred and non-limiting embodiment or aspect, the attachment member opening defines a slot extending from a perimeter of the attachment member opening, wherein a slidable member is positioned at least partially in the slot and slidable along the attachment member opening and the slot.

In one preferred and non-limiting embodiment or aspect, the at least one second pivot member is shaped such that an edge of the first end of the at least one second pivot member contacts the cable to brake or stop movement of the fall protection device.

In one preferred and non-limiting embodiment or aspect, a plurality of second pivot members are provided, wherein at least one of the plurality of second pivot members is configured to contact the cable to brake or stop movement of the fall protection device. In another preferred and non-limiting embodiment or aspect, at least one pin directly or indirectly pivotally connects the first end of at least one of the plurality of second pivot members to the at least one first lateral member. In another preferred and non-limiting embodiment or aspect, the at least one first lateral member comprises a substantially U-shaped cross section, wherein a top area of the U-shape is defined by a first wall and a second wall and configured to receive at least a portion of the first end of the at least one first pivot member and at least a portion of the first end of the at least one second pivot member therebetween, wherein the at least one pin directly or indirectly connects at least one of the plurality of second pivot members between the first wall and the second wall. In another preferred and non-limiting embodiment or aspect the plurality of second pivot members are attached together. In another preferred and non-limiting embodiment or aspect, at least one biasing member directly or indirectly contacts at least a portion of at least one of the plurality of second pivot members, wherein the at least one biasing member is configured to bias or urge the at least one second lateral member in one direction. In another preferred and non-limiting embodiment or aspect, at least one pin directly or indirectly connects the second end of at least one of the plurality of second pivot members to the at least one second lateral member.

In one preferred and non-limiting embodiment or aspect, the at least one first pivot member is shaped, such that an edge of the first end of the at least one first pivot member contacts the cable to brake or stop movement of the fall protection device.

In one preferred and non-limiting embodiment or aspect, a plurality of first pivot members are provided, wherein at least one of the plurality of first pivot members is configured to contact the cable to brake or stop movement of the fall protection device. In one preferred and non-limiting embodiment or aspect, at least one pin directly or indirectly pivotally connects the first end of at least one of the plurality of first pivot members to the at least one first lateral member. In another preferred and non-limiting embodiment or aspect, the at least one slot extends through the first end of the plurality of first pivot members, and the at least one pin extends through and is configured to move along the at least one slot. In another preferred and non-limiting embodiment or aspect, the at least one first lateral member comprises a substantially U-shaped cross section, wherein a top area of the U-shape is defined by a first wall and a second wall and configured to receive at least a portion of the first end of the at least one first pivot member and at least a portion of the first end of the at least one second pivot member therebetween, wherein the at least one pin directly or indirectly connects at least one of the plurality of first pivot members between the first wall and the second wall. In another preferred and non-limiting embodiment or aspect, the plurality of first pivot members are attached together. In another preferred and non-limiting embodiment or aspect, at least one pin directly or indirectly connects the second end of at least one of the plurality of first pivot members to the at least one second lateral member.

In one preferred and non-limiting embodiment or aspect, at least a portion of the at least one first pivot member and/or the at least one second pivot member is connected between two second lateral members.

In one preferred and non-limiting embodiment or aspect, the at least one slot extends through at least a portion of the first end of the at least one first pivot member.

In one preferred and non-limiting embodiment or aspect, at least a portion of the first pivot member and/or the second pivot member comprises at least one of the following: projections, indentations, ribs, slots, grooves, a coating, a friction material, knurling, or any combination thereof. In another preferred and non-limiting embodiment or aspect, at least a portion of the first end of the first pivot member and/or the second pivot member comprises at least one of the following: projections, indentations, ribs, slots, grooves, a coating, a friction material, knurling, or any combination thereof.

In one preferred and non-limiting embodiment or aspect, the at least one slot is at least one of the following: shaped, sized, oriented, or any combination thereof, to facilitate the movement or urging of at least a portion of the first end of the at least one first pivot member and/or the first end of the at least one second pivot member into contact with the cable to brake or stop the movement of the fall protection device.

In one preferred and non-limiting embodiment or aspect, at least one pin extends through and is configured to slide along the at least one slot, wherein the at least one pin has at least one of the following cross sections: circular, triangular, square, or any combination thereof.

In one preferred and non-limiting embodiment or aspect, provided is a fall protection device for use with a generally vertically-extending cable, comprising: an articulating frame comprising: (i) a plurality of members; (ii) a channel configured to receive and retain the cable; and (iii) an attachment member opening extending through at least a portion of the articulating frame and configured to facilitate attachment of an attachment member to the fall protection device; wherein, when the frame is articulated in a generally downward direction, and at a specified point, at least a portion of at least one of the plurality of members contacts the cable and brakes or stops movement of the fall protection device; wherein, when the frame is articulated in a generally upward direction, and at a specified point, at least a portion of at least one of the plurality of members contacts the cable and brakes or stops movement of the fall protection device.

Further embodiments or aspects will now be described in the following numbered clauses.

Clause 1: A fall protection device for use with a generally vertically-extending cable, comprising: at least one first lateral member having a channel configured to receive and retain the cable; at least one second lateral member spaced from the at least one first lateral member; at least one first pivot member pivotally attached between a first end of the at least one first lateral member and a first end of the at least one second lateral member; at least one second pivot member pivotally attached between a second end of the at least one first lateral member and a second end of the at least one second lateral member; and an attachment member opening extending through at least a portion of at least one of the following: the at least one second lateral member, the at least one first pivot member, the at least one second pivot member, or any combination thereof, wherein the attachment member opening is configured to facilitate attachment of an attachment member to the fall protection device; wherein, when the fall protection device is moved or urged in a generally downward direction, and at a specified point, at least a portion of a first end of the at least one first pivot member and/or a first end of the at least one second pivot member contacts the cable and brakes or stops movement of the fall protection device; wherein at least one slot extends through at least a portion of the first end of the at least one first pivot member and/or the first end of the at least one second pivot member, such that if the at least one second lateral member is urged or moved in a generally upward direction with respect to the at least one first lateral member, and at a specified point, at least a portion of the first end of the at least one first pivot member and/or the first end of the at least one second pivot member contacts the cable and brakes movement of the fall protection device.

Clause 2: The fall protection device of clause 1, further comprising at least one biasing member configured to bias or urge the at least one second lateral member in one direction.

Clause 3: The fall protection device of clause 2, wherein the at least one biasing member is a spring.

Clause 4: The fall protection device of any of clauses 1-3, wherein the at least one first lateral member comprises a substantially U-shaped cross section, wherein a bottom area of the U-shape defines the channel and a top area of the U-shape is configured to receive at least a portion of the first end of the at least one first pivot member and at least a portion of the first end of the at least one second pivot member therebetween.

Clause 5: The fall protection device of clause 4, further comprising a shaped slot in the bottom area of the U-shape, such that the fall protection device is removably connectable to the cable by first moving the shaped slot over the cable and twisting the fall protection device to seat the cable in the channel.

Clause 6: The fall protection device of clauses 4 or 5, further comprising a generally S-shaped slot having a first linear portion, a transverse portion, and a second linear portion.

Clause 7: The fall protection device of any of clauses 1-6, wherein the attachment member opening is shaped.

Clause 8: The fall protection device of clause 7, wherein the attachment member opening defines a slot extending from a perimeter of the attachment member opening, wherein a slidable member is positioned at least partially in the slot and slidable along the attachment member opening and the slot.

Clause 9: The fall protection device of any of clauses 1-8, wherein the at least one second pivot member is shaped, such that an edge of the first end of the at least one second pivot member contacts the cable to brake or stop movement of the fall protection device.

Clause 10: The fall protection device of any of clauses 1-9, further comprising a plurality of second pivot members, wherein at least one of the plurality of second pivot members is configured to contact the cable to brake or stop movement of the fall protection device.

Clause 11: The fall protection device of clause 10, further comprising at least one pin directly or indirectly pivotally connecting the first end of at least one of the plurality of second pivot members to the at least one first lateral member.

Clause 12: The fall protection device of clause 11, wherein the at least one first lateral member comprises a substantially U-shaped cross section, wherein a top area of the U-shape is defined by a first wall and a second wall and configured to receive at least a portion of the first end of the at least one first pivot member and at least a portion of the first end of the at least one second pivot member therebetween, wherein the at least one pin directly or indirectly connects at least one of the plurality of second pivot members between the first wall and the second wall.

Clause 13: The fall protection device of any of clauses 10-12, wherein the plurality of second pivot members are attached together.

Clause 14: The fall protection device of any of clauses 10-13, further comprising at least one biasing member directly or indirectly contacting at least a portion of at least one of the plurality of second pivot members, wherein the at least one biasing member is configured to bias or urge the at least one second lateral member in one direction.

Clause 15: The fall protection device of any of clauses 10-14, further comprising at least one pin directly or indirectly connecting a second end of at least one of the plurality of second pivot members to the at least one second lateral member.

Clause 16: The fall protection device of any of clauses 1-15, wherein the at least one first pivot member is shaped, such that an edge of the first end of the at least one first pivot member contacts the cable to brake or stop movement of the fall protection device.

Clause 17: The fall protection device of any of clauses 1-16, further comprising a plurality of first pivot members, wherein at least one of the plurality of first pivot members is configured to contact the cable to brake or stop movement of the fall protection device.

Clause 18: The fall protection device of clause 17, further comprising at least one pin directly or indirectly pivotally connecting the first end of at least one of the plurality of first pivot members to the at least one first lateral member.

Clause 19: The fall protection device of clause 18, wherein the at least one slot extends through the first end of the plurality of first pivot members, and the at least one pin extends through and is configured to move along the at least one slot.

Clause 20: The fall protection device of clause 18 or 19, wherein the at least one first lateral member comprises a substantially U-shaped cross section, wherein a top area of the U-shape is defined by a first wall and a second wall and configured to receive at least a portion of the first end of the at least one first pivot member and at least a portion of the first end of the at least one second pivot member therebetween, wherein the at least one pin directly or indirectly connects at least one of the plurality of first pivot members between the first wall and the second wall.

Clause 21: The fall protection device of any of clauses 17-20, wherein the plurality of first pivot members are attached together.

Clause 22: The fall protection device of clause 17, further comprising at least one pin directly or indirectly connecting the second end of at least one of the plurality of first pivot members to the at least one second lateral member.

Clause 23: The fall protection device of any of clauses 1-22, wherein at least a portion of the at least one first pivot member and/or the at least one second pivot member is connected between two second lateral members.

Clause 24: The fall protection device of any of clauses 1-23, wherein the at least one slot extends through at least a portion of the first end of the at least one first pivot member.

Clause 25: The fall protection device of any of clauses 1-24, wherein at least a portion of the first pivot member and/or the second pivot member comprises at least one of the following: projections, indentations, ribs, slots, grooves, a coating, a friction material, knurling, or any combination thereof.

Clause 26: The fall protection device of any of clauses 1-25, wherein at least a portion of the first end of the first pivot member and/or the second pivot member comprises at least one of the following: projections, indentations, ribs, slots, grooves, a coating, a friction material, knurling, or any combination thereof.

Clause 27: The fall protection device of any of clauses 1-26, wherein the at least one slot is at least one of the following: shaped, sized, oriented, or any combination thereof, to facilitate the movement or urging of at least a portion of the first end of the at least one first pivot member and/or the first end of the at least one second pivot member into contact with the cable to brake or stop the movement of the fall protection device.

Clause 28: The fall protection device of any of clauses 1-27, further comprising at least one pin extending through and configured to slide along the at least one slot, wherein the at least one pin has at least one of the following cross sections: circular, triangular, square, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As illustrated in various preferred and non-limiting embodiments or aspects, and modes of operation, in FIGS. 8-27, the present invention is directed to a fall protection device, e.g., a cable grab device 10, for use with a generally vertically-extending cable (C) or line (see, e.g., FIGS. 17-20). As discussed above, this cable (C) can extend upward along a vertical structure or building, and may be positioned with respect to a ladder, or a ladder and cage structure. It is envisioned, however, that the cable grab device 10 can be used in conjunction with any elongate cable or line where braking is required along the length of the cable or line.

Figure 8:
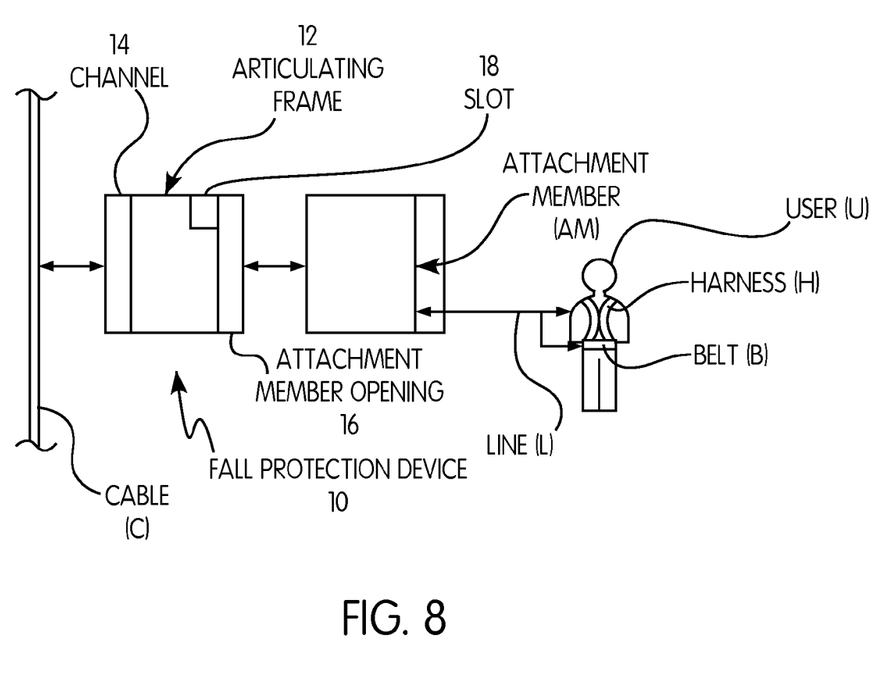
FIG. 8 is a schematic view of a fall protection device according to the principles of the present invention.

In one preferred and non-limiting embodiment or aspect, and as illustrated in schematic form in FIG. 8, the cable grab device 10 is (preferably, removably) attachable to and between the cable (C) and an attachment member (AM), such as a carabiner, a clip, and the like. The attachment member (AM) is attached to a line (L), which is attached to a connection point on the user (U), such as a harness (H) or a belt (B). The cable grab device 10 includes an articulating frame 12 that includes or defines a channel 14 shaped or configured to receive and retain the cable (C) and an attachment member opening 16 extending through at least a portion of the frame 12, where this attachment member opening 16 is shaped or configured to facilitate attachment of the attachment member (AM) to the cable grab device 10. When the frame 12 is articulated in a generally downward (or first) direction, and at a specified point, at least a portion of the frame 12 contacts the cable (C) and brakes or stops movement of the cable grab device 10. Further, when the frame 12 is articulated in a generally upward (or second) direction, and at a specified point, at least a portion of the frame 12 contacts the cable (C) and brakes or stops movement of the cable grab device 10. In this manner, regardless of how the frame 12 is articulated or urged, rapid downward movement (e.g., a fall condition) will be braked and stopped. This means that, in the situation discussed above, where the person grabs or grasps the cable grab device 10 where the frame articulates in a generally upward direction, the cable grab device 10 will still effectively operate and engage the cable (C). In one preferred and non-limiting embodiment or aspect, and as illustrated in FIG. 8, this beneficial bi-directional engagement functionality can be effected through the use of at least one slot 18, which is included in or defined by a portion of the frame 12.

In another preferred and non-limiting embodiment or aspect, and with reference to FIGS. 9-20, the frame 12 comprises or includes: at least one first lateral member 20 (with the above-referenced channel 14 positioned thereon or defined thereby); at least one second lateral member 22 spaced from the at least one first lateral member 20; at least one first pivot member 24 pivotally attached between a first end 26 of the at least one first lateral member 20 and a first end 28 of the at least one second lateral member 22; and at least one second pivot member 30 pivotally attached between a second end 32 of the at least one first lateral member 20 and a second end 34 of the at least one second lateral member 22. The pivotal connection between the first ends (26, 28) and the second ends (32, 34) create or define an articulating frame, e.g., frame 12.

In this embodiment or aspect, the above-discussed attachment member opening 16 is provided and extends through at least a portion of at least one of the following: the at least one second lateral member 22, the at least one first pivot member 24, the at least one second pivot member 30, or any combination thereof, and as discussed, this attachment member opening 16 is shaped or configured to facilitate attachment of the attachment member (AM) to the cable grab device 10.

In operation, when the cable grab device 10 is moved or urged in a generally downward (or first) direction, and at a specified point, at least a portion of a first end 36 of the at least one first pivot member 24 and/or a first end 38 of the at least one second pivot member 30 contacts the cable (C) and brakes or stops movement of the cable grab device 10. In addition, in this embodiment or aspect, the above-discussed at least one slot 18 is provided and extends through at least a portion of the first end 36 of the at least one first pivot member 24 and/or the first end 38 of the at least one second pivot member 30, such that if the at least one second lateral member 22 is urged or moved in a generally upward (or second) direction with respect to the at least one first lateral member 20, and at a specified point, at least a portion of the first end 36 of the at least one first pivot member 24 and/or the first end 38 of the at least one second pivot member 30 contacts the cable (C) and brakes or stops movement of the cable grab device 10; again, resulting in the bi-directional articulating frame functionality.

Figures 9, 10:
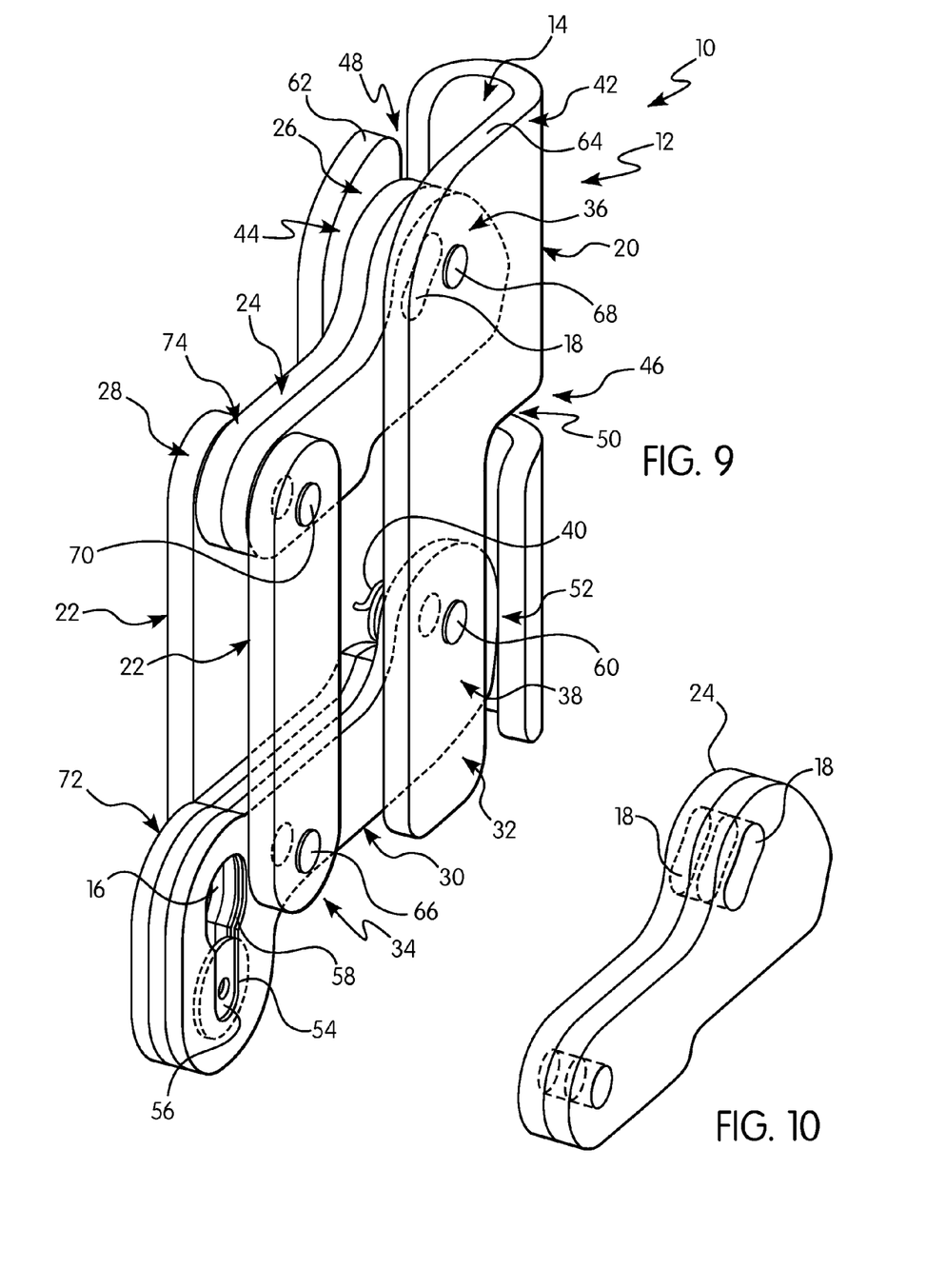
FIG. 9 is a perspective view of one embodiment or aspect of a cable grab device according to the principles of the present invention.
FIG. 10 is a perspective view of a first pivot member of the cable grab device of FIG. 9.
Figure 11:
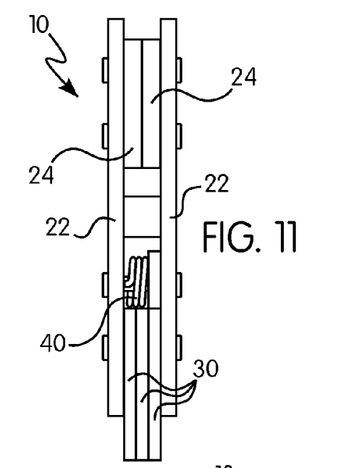
FIG. 11 is a first edge view of the cable grab device of FIG. 9 during normal operation.
Figure 12:
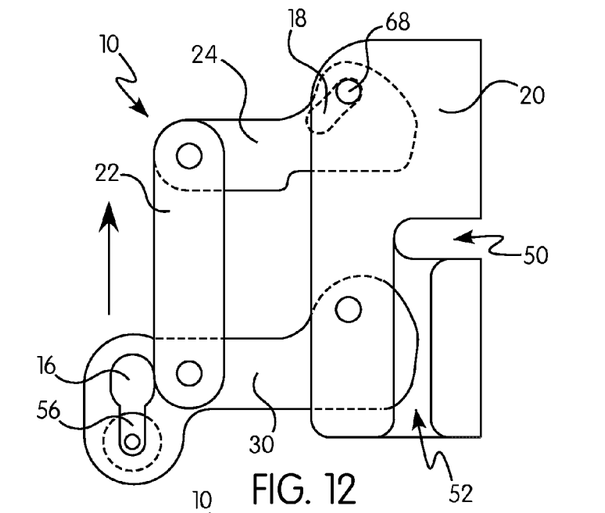
FIG. 12 is a first side view of the cable grab device of FIG. 11.
Figure 13:
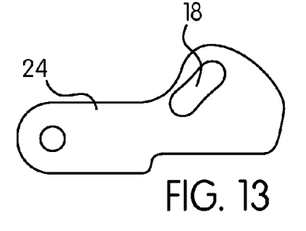
FIG. 13 is a side view of a first pivot member of the cable grab device of FIG. 11.
Figure 14:
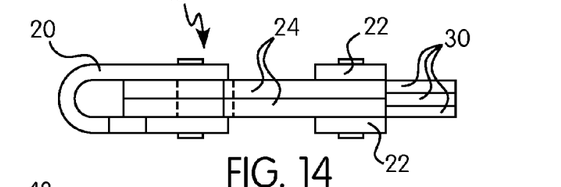
FIG. 14 is an end view of the cable grab device of FIG. 11.
Figure 15:
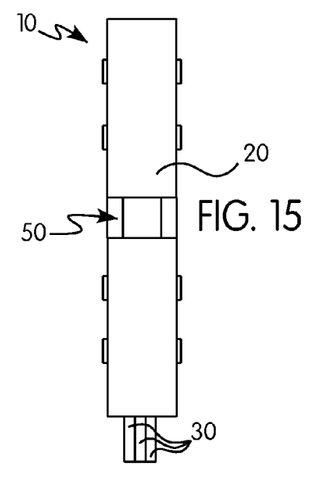
FIG. 15 is a second edge view of the cable grab device of FIG. 11.
Figure 16:
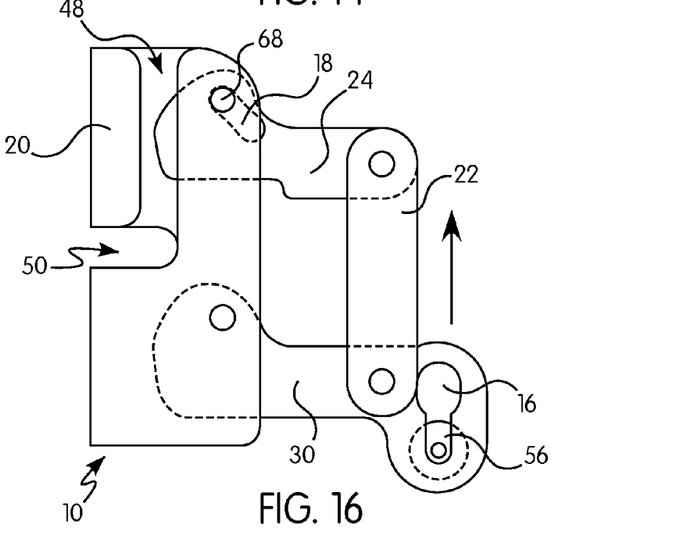
FIG. 16 is a second side view of the cable grab device of FIG. 11.
Figure 17:
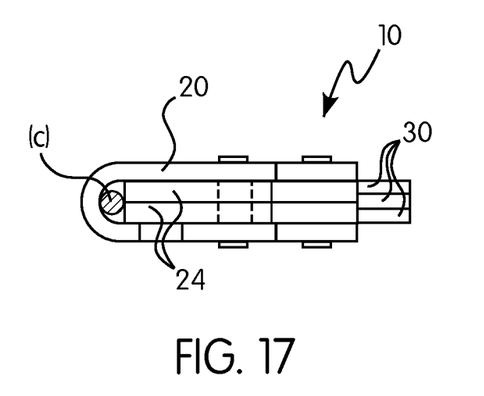
FIG. 17 is a top view of the cable grab device of FIG. 9 during movement or urging in a first direction.
Figure 18:
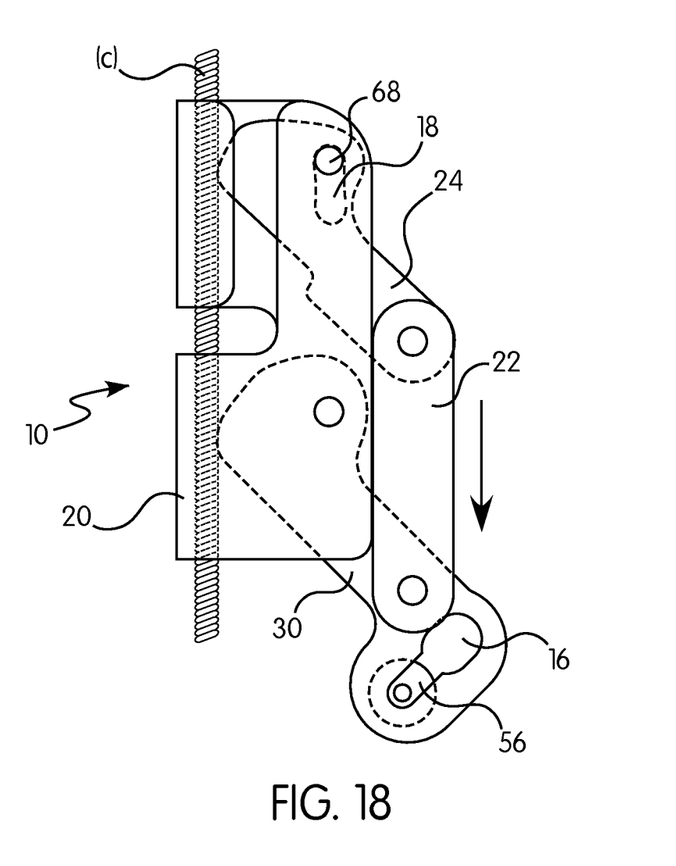
FIG. 18 is a side view of the cable grab device of FIG. 17.
Figure 19:
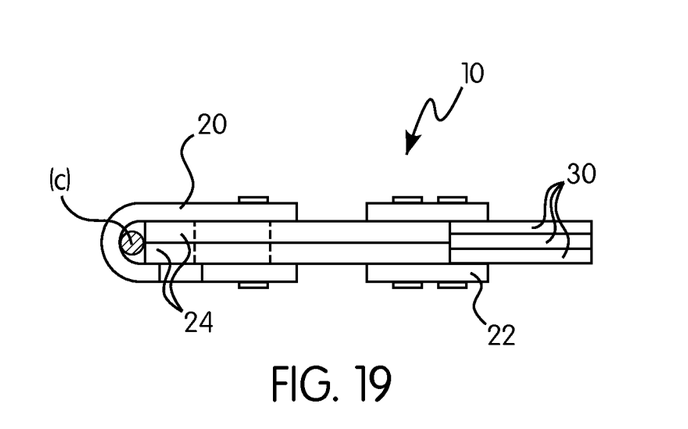
FIG. 19 is a top view of the cable grab device of FIG. 9 during movement or urging in a second direction.
Figure 20:
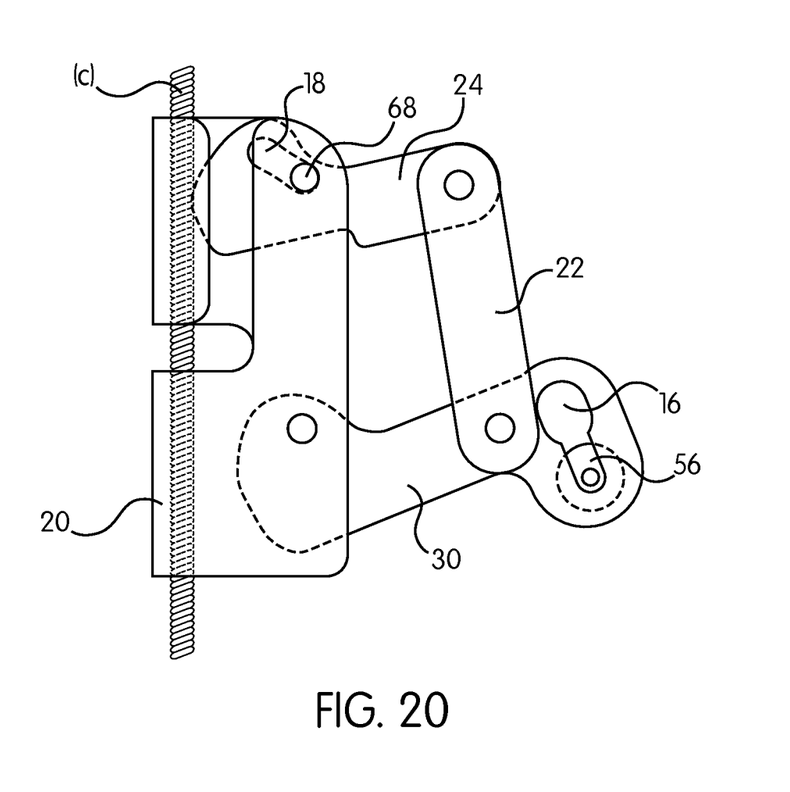
FIG. 20 is a side view of the cable grab device of FIG. 19.

In one preferred and non-limiting embodiment or aspect, and as best seen in FIGS. 9 and 11, the cable grab device 10 includes at least one biasing member 40 positioned or configured to bias or urge the at least one second lateral member 22 in one direction, preferably a generally downward (e.g., closed) direction with respect to the attachment of the cable grab device 10 to the cable (C). Such a bias serves to urge the cable grab device 10 into a closed or downward-articulated position, which represents a position where the first end 36 of the at least one first pivot member 24 and/or the first end 38 of the at least one second pivot member 30 engages the cable (C). Accordingly, this is a fail-safe or fail-closed position, thereby braking or preventing movement of the cable grab device 10 with respect to the cable (C). The at least one biasing member 40 may be in the form of one or more springs. It is important to note that the general orientation, relative positions, and relative forces between the at least one biasing member 40, the attachment member (AM), the line (L), and the upward movement of the user (U), cause the cable grab device 10 to remain in an "open" position (even against the bias) as the user (U) moves up the ladder.

In one preferred and non-limiting embodiment or aspect, the at least one first lateral member 20 includes or defines a substantially U-shaped cross section, wherein a base (or lower) area 42 of the U-shape defines the channel 14 and a top (or upper) area 44 of the U-shape is shaped or configured to receive at least a portion of the first end 36 of the at least one first pivot member 24 and at least a portion of the first end 38 of the at least one second pivot member 30 therebetween.

In one preferred and non-limiting embodiment or aspect, the cable grab device, preferably the first lateral member 20, includes or defines a shaped slot 46, and this shaped slot 46 may be positioned in or defined in the base area 42 of the U-shape, such that the cable grab device 10 is removably connectable to the cable (C) by first moving a portion of the shaped slot 46 over the cable (C) and twisting (e.g., 180°) the cable grab device 10 to seat the cable (C) in the channel 14. By using this shaped slot 46 (with the accompanying twisting or manipulating motion), the cable grab device 10 is easily and quickly connectable to the cable (C), while also effectively and safely retaining the cable (C) in the channel 14 (such that the cable grab device 10 does not become accidentally disengaged from the cable (C) during operation).

In one preferred and non-limiting embodiment or aspect, and as best illustrated in FIG. 9, the shaped slot 46 is in the form of a generally S-shaped slot having a first linear portion 48 (or area), a transverse portion 50 (or area), and a second linear portion 52 (or area). In order to attach the cable grab device 10 to the cable (C), the cable grab device 10 is oriented to allow passage of the cable (C) through the transverse portion 50, and then twisted 180° to facilitate passage of the cable (C) simultaneously through the first linear portion 48 and the second linear portion 52 (which are positioned opposite and offset from each other on the first lateral member 20). As discussed above, this allows the quick attachment and detachment of the cable grab device 10, with a secure connection during operation.

As seen in FIGS. 9, 12, 16, 18, and 20, and in one preferred and non-limiting embodiment or aspect, the attachment member opening 16 is shaped. In this embodiment or aspect, the attachment member opening 16 defines a slot 54 extending from a perimeter of the attachment member opening 16. A slidable member 56 is positioned at least partially in the slot 54 and slidable along the attachment member opening 16 and slot 54. For example, the slidable member 56 may be captured within and slidable along a groove 58, and this slidable member 56 may be a washer or the like. This functionality is used to guide the user (U) in attaching the cable grab device 10 is the appropriate orientation. In particular, if the cable grab device 10 is inverted, the user (U) will be unable to attach his or her attachment member (AM), since (due to gravity) the slidable member 56 will be covering or interfering with the attachment member opening 16 (which, when unobstructed, is sized and shaped to allow passage of the attachment member (AM) therethrough) and due to the size of the slot 54 preventing passage of the attachment member (AM) therethrough. However, if the cable grab device 10 is in the desired orientation (which may also be indicated by placing markings or indicators on the frame 12), the slidable member 56 will be positioned in the slot 54, thereby allowing free passage of the attachment member (AM) through the attachment member opening 16.

In one preferred and non-limiting embodiment or aspect, the at least one second pivot member 30 is shaped, such that an edge of the first end 38 of the at least one second pivot member 30 contacts the cable (C) to brake or stop movement of the cable grab device 10.

In one preferred and non-limiting embodiment or aspect, a plurality of second pivot members 30 is provided, where at least one of the plurality of second pivot members 30 is configured to contact the cable (C) to brake or stop movement of the cable grab device 10. This provides additional structure and strength to the frame 12, and also facilitates certain interactions and functions, as discussed herein. In addition, at least one pin 60 may be used to directly or indirectly pivotally connect the first end 38 of at least one of the plurality of second pivot members 30 to the at least one first lateral member 20. Further, the at least one first lateral member 20 may have a substantially U-shaped cross section (as discussed above), where the top area 44 of the U-shape is defined by a first wall 62 and a second wall 64 and sized, shaped, or spaced to receive at least a portion of the first end 36 of the at least one first pivot member 24 and at least a portion of the first end 38 of the at least one second pivot member 30 therebetween. The at least one pin 60 directly or indirectly connects at least one of the plurality of second pivot members 30 between the first wall 62 and the second wall 64.

In one preferred and non-limiting embodiment or aspect, the plurality of second pivot members 30 are attached together, such as by using the above-discussed at least one pin 60. In another preferred and non-limiting embodiment or aspect, the above-referenced biasing member 40 (e.g., a coil spring) is used and configured to urge or bias at least a portion of at least one of the plurality of second pivot members 30 in a specified (e.g., generally downward) direction. Further, this biasing member 40 can be positioned and held with respect to the frame 12 using the above-referenced at least one pin 60. In one preferred and non-limiting embodiment or aspect, the cable grab device 10 includes at least one pin 66 that directly or indirectly connects a second end 72 of at least one of the plurality of second pivot members 30 to the at least one second lateral member 22, such as to the second end 34 of the at least one second lateral member 22. In another preferred and non-limiting embodiment or aspect, the second end 72 of at least one of the plurality of second pivot members 30 is captured between two second lateral members 22 (such as the second ends 34 of these second lateral members 22) through the use of at least one pin 66.

In one preferred and non-limiting embodiment or aspect, the at least one first pivot member 24 is shaped such that an edge of the first end 36 of the at least one first pivot member 24 contacts the cable (C) to brake or stop movement of the cable grab device 10.

In one preferred and non-limiting embodiment or aspect, the cable grab device 10 includes a plurality of first pivot members 24, where at least one of the plurality of first pivot members 24 is configured to contact the cable (C) to brake or stop movement of the cable grab device 10. This also provides the additional strength and functional characteristics discussed above in connection with the plurality of second pivot members 30. At least one pin 68 may directly or indirectly pivotally connect the first end 36 of at least one of the plurality of first pivot members 24 to the at least one first lateral member 20.

In another preferred and non-limiting embodiment or aspect, the at least one slot 18 extends through the first end 36 of the plurality of first pivot members 24, and the at least one pin 68 extends through and is configured to move along the at least one slot 18. Based upon the size and shape of the at least one slot 18, and as discussed above, the beneficial bi-directional engagement functionality (e.g., engagement in the generally upward direction) is facilitated. In particular, as the frame 12 is articulated in the generally upward direction (e.g., where the second lateral member 22 is moving upward relative to the first lateral member 20), the at least one pin 68 moves along the at least one slot 18 (and/or the at least one slot 18 moves with respect to the at least one pin 68), which causes the first end 36 the of at least one first pivot member 24 to contact or engage the cable (C). It is envisioned that the at least one slot 18 may be positioned on the at least one second pivot member 30, or on both the at least one first pivot member 24 and the at least one second pivot member 30.

In one preferred and non-limiting embodiment or aspect, where the at least one first lateral member 20 has the U-shape with first wall 62 and a second wall 64, the first end 36 of at least one of the plurality of first pivot members 24 is captured between the first wall 62 and the second wall 64, such as through the use of the at least one pin 68. In this manner, the plurality of first pivot members 24 are directly or indirectly connected between the first wall 62 and the second wall 64. In another preferred and non-limiting embodiment or aspect, and as with the second pivot members 30, the plurality of first pivot members 24 may be attached together.

In another preferred and non-limiting embodiment or aspect, at least one pin 70 directly or indirectly connects a second end 74 at least one of the plurality of first pivot members 24 to the at least one second lateral member 22. In another preferred and non-limiting embodiment or aspect, the at least one slot 18 extends through at least a portion of the first end 36 of the at least one first pivot member 24. In another preferred and non-limiting embodiment or aspect, the second end 74 of at least one of the plurality of first pivot members 24 is captured between two second lateral members 22 (such as the first ends 28 of these second lateral members 22) through the use of the at least one pin 70.

In one preferred and non-limiting embodiment or aspect, at least a portion of the first pivot member 24 and/or the second pivot member 30 includes, is formed with, or defines at least one of the following: projections, indentations, ribs, slots, grooves, a coating, a friction material, knurling, or any combination thereof. In another preferred and non-limiting embodiment or aspect, at least a portion of the first end 36, 38 of the first pivot member 24 and/or the second pivot member 30 includes, is formed with, or defines at least one of the following: projections, indentations, ribs, slots, grooves, a coating, a friction material, knurling, or any combination thereof.

Figure 21:
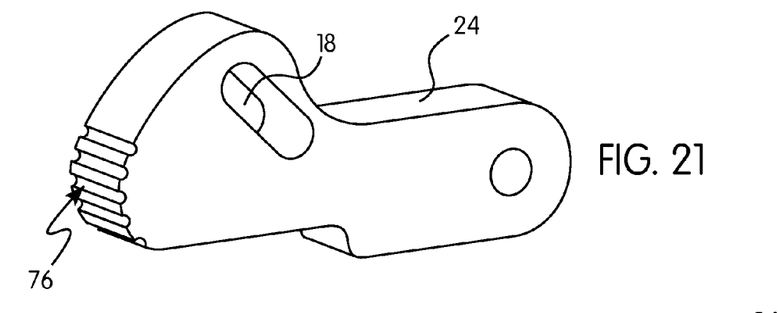
FIG. 21 is a perspective view of one embodiment or aspect of a first pivot member of a cable grab device according to the principles of the present invention.

As illustrated in FIG. 21, and in one preferred and non-limiting embodiment aspect, the first end 36 (and/or edge) of the first pivot member 24 includes slots, indentations, or grooves 76, which facilitate a better grip or engagement between the first end 36 of the first pivot member 24 and the cable (C). Of course, these slots, indentations, or grooves 76 may also be used in connection with the first end 38 (and/or edge) of the second pivot member 30 to achieve the same effect. Further, it is envisioned that projections or ribs may also be utilized to facilitate improved gripping or engagement characteristics.

Figure 22:
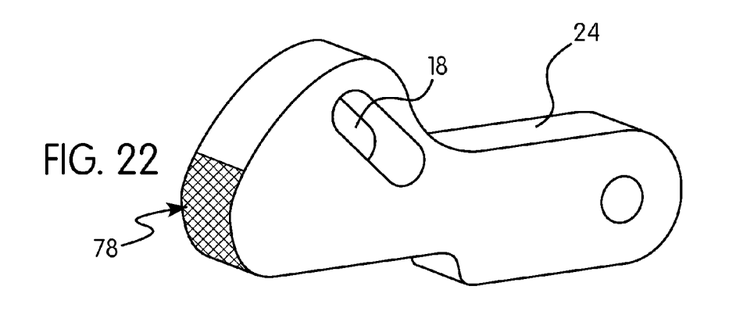
FIG. 22 is a perspective view of another embodiment or aspect of a first pivot member of a cable grab device according to the principles of the present invention.

As illustrated in FIG. 22, and in one preferred and non-limiting embodiment or aspect, the first end 36 (and/or edge) of the first pivot member 24 includes knurling 78, which facilitates a better grip or engagement between the first end 36 of the first pivot member 24 and the cable (C). Of course, this knurling 78 may also be used in connection with the first end 38 (and/or edge) of the second pivot member 30 to achieve the same effect.

Figure 23:
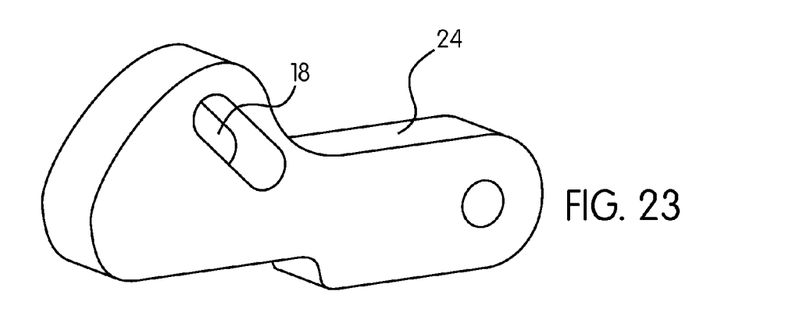
FIG. 23 is a perspective view of a further embodiment or aspect of a first pivot member of a cable grab device according to the principles of the present invention.
Figure 24:
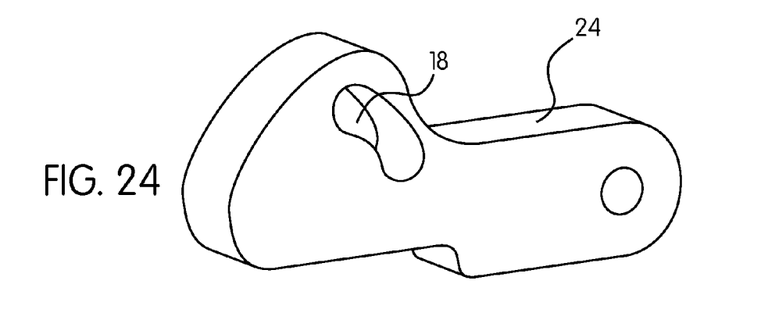
FIG. 24 is a perspective view of another embodiment or aspect of a first pivot member of a cable grab device according to the principles of the present invention.
Figure 25:
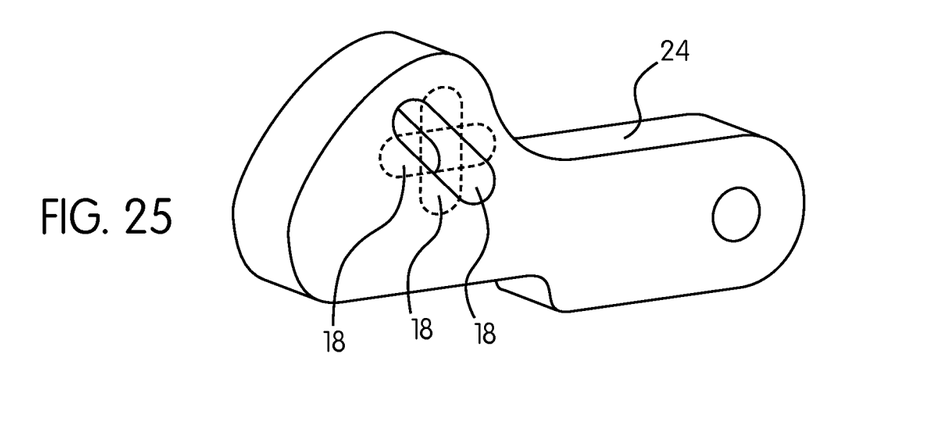
FIG. 25 is a perspective view of various embodiments or aspects of a first pivot member of a cable grab device according to the principles of the present invention.
Figure 26:
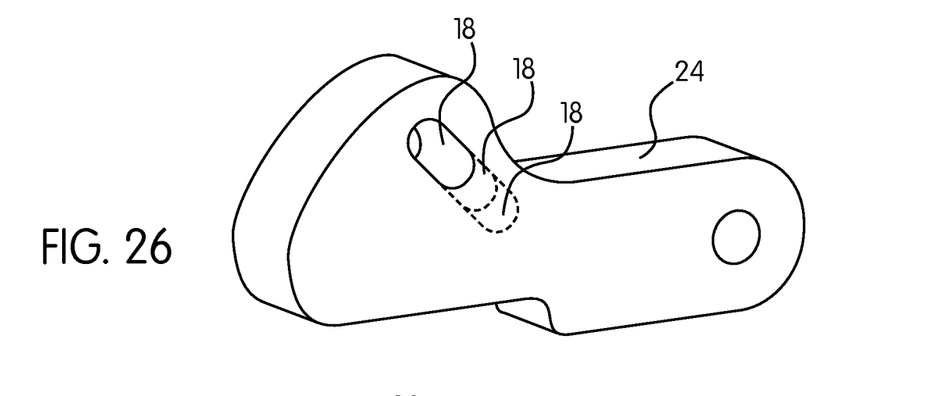
FIG. 26 is a perspective view of various embodiments or aspects of a first pivot member of a cable grab device according to the principles of the present invention.

In one preferred and non-limiting embodiment or aspect, the at least one slot 18 is at least one of the following: shaped, sized, oriented, or any combination thereof, to facilitate the movement or urging of at least a portion of the first end 36 of the at least one first pivot member 24 and/or the first end 38 of the at least one second pivot member 30 into contact with the cable (C) to brake or stop the movement of the cable grab device. In one preferred and non-limiting embodiment or aspect, and as illustrated in FIG. 23, the at least one slot 18 includes or is in the form of an angled, generally oval shape. In another preferred and non-limiting embodiment or aspect, and as illustrated in FIG. 24, the at least one slot 18 includes or is in the form of an angled, slightly curved shape. In one preferred and non-limiting embodiment or aspect, and as shown in FIG. 25, the at least one slot 18 may extend at various angles (or orientations) with respect to the body of the first pivot member 24 and/or the second pivot member 30. In one preferred and non-limiting embodiment or aspect, and as shown in FIG. 26, the at least one slot 18 may extend to various lengths.

Figure 27:
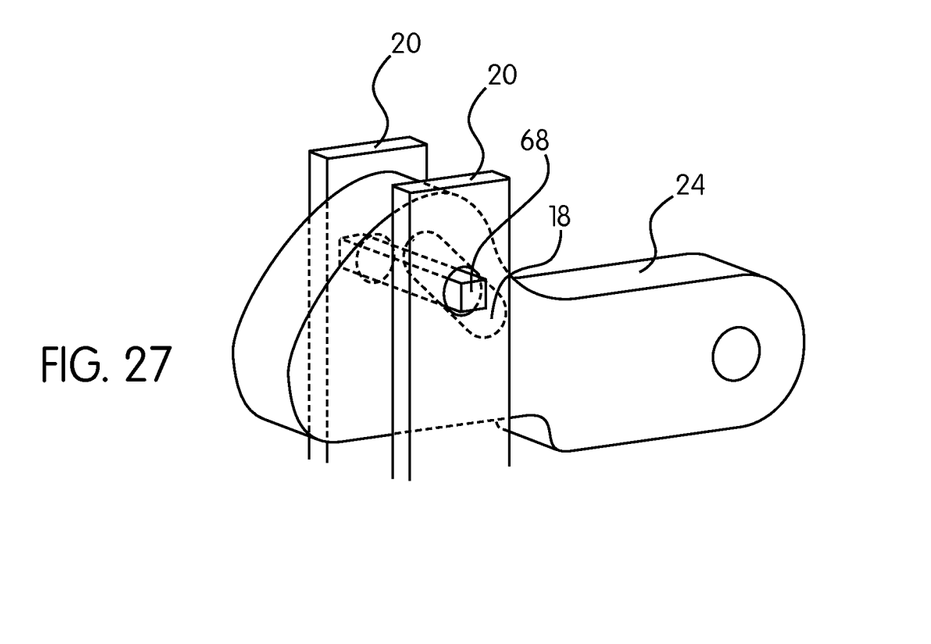
FIG. 27 is a perspective view of another embodiment or aspect of a first pivot member of a cable grab device according to the principles of the present invention.

In one preferred and non-limiting embodiment or aspect, the pins 60, 66, 68, 70 may have or exhibit various shapes or cross sections, such as circular, triangular, square, and the like. As illustrated in FIG. 27, and in one preferred and non-limiting embodiment or aspect, the at least one pin 68 has a square shape, which changes the manner in which the at least one pin 68 moves along and within the at least one slot 18. Of course, if the at least one slot 18 is alternatively or additionally positioned or defined on the second pivot member 30, the at least one pin 60 may also include a different shape, such as a shape that assists in the attachment or operation of the at least one biasing member 40.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

The invention claimed is:

1. A fall protection device for use with a generally vertically-extending cable, comprising:
   at least one first lateral member having a channel configured to receive and retain the cable;
   at least one second lateral member spaced from the at least one first lateral member;
   at least one first pivot member pivotally attached between a first end of the at least one first lateral member and a first end of the at least one second lateral member;
   at least one second pivot member pivotally attached between a second end of the at least one first lateral member and a second end of the at least one second lateral member; and
   an attachment member opening extending through at least a portion of at least one of the following: the at least one second lateral member, the at least one first pivot member, the at least one second pivot member, or any combination thereof, wherein the attachment member opening is configured to facilitate attachment of an attachment member to the fall protection device;
   wherein, when the fall protection device is moved or urged in a generally downward direction, and at a specified point, at least a portion of a first end of the at least one first pivot member and/or a first end of the at least one second pivot member contacts the cable and brakes or stops movement of the fall protection device;
   wherein at least one slot extends through at least a portion of the first end of the at least one first pivot member and/or the first end of the at least one second pivot member, such that if the at least one second lateral member is urged or moved in a generally upward direction with respect to the at least one first lateral member, and at a specified point, at least a portion of the first end of the at least one first pivot member and/or the first end of the at least one second pivot member contacts the cable and brakes the fall protection device.

2. The fall protection device of claim 1, further comprising at least one biasing member configured to bias or urge the at least one second lateral member in one direction.

3. The fall protection device of claim 2, wherein the at least one biasing member is a spring.

4. The fall protection device of claim 1, wherein the at least one first lateral member comprises a substantially U-shaped cross section, wherein a base area of the U-shape defines the channel and a top area of the U-shape is configured to receive at least a portion of the first end of the at least one first pivot member and at least a portion of the first end of the at least one second pivot member therebetween.

5. The fall protection device of claim 4, further comprising a shaped slot in the base area of the U-shape, such that the fall protection device is removably connectable to the cable by first moving the shaped slot over the cable and twisting the fall protection device to seat the cable in the channel.

6. The fall protection device of claim 1, wherein the attachment member opening defines a slot extending from a perimeter of the attachment member opening, wherein a slidable member is positioned at least partially in the slot and slidable along the attachment member opening and the slot.

7. The fall protection device of claim 1, wherein the at least one first lateral member comprises a substantially U-shaped cross section, wherein a top area of the U-shape is defined by a first wall and a second wall and is configured to receive at least a portion of the first end of the at least one first pivot member and at least a portion of the first end of the at least one second pivot member therebetween, wherein the at least one pin directly or indirectly connects at least one of the plurality of second pivot members between the first wall and the second wall.

8. The fall protection device of claim 1, further comprising at least one biasing member directly or indirectly contacting at least a portion of at least one of the plurality of second pivot members, wherein the at least one biasing member is configured to bias or urge the at least one second lateral member in one direction.

9. The fall protection device of claim 1, further comprising at least one pin directly or indirectly connecting a second end of at least one of the plurality of second pivot members to the at least one second lateral member.

10. The fall protection device of claim 1, wherein the at least one first pivot member is shaped, such that an edge of the first end of the at least one first pivot member contacts the cable to brake the fall protection device.

11. The fall protection device of claim 1, further comprising a plurality of first pivot members, wherein at least one of the plurality of first pivot members is configured to contact the cable to brake the fall protection device.

12. The fall protection device of claim 11, further comprising at least one pin directly or indirectly pivotally connecting the first end of at least one of the plurality of first pivot members to the at least one first lateral member.

13. The fall protection device of claim 12, wherein the at least one slot extends through the first end of the plurality of first pivot members, and the at least one pin extends through and is configured to move along the at least one slot.

14. The fall protection device of claim 12, wherein the at least one first lateral member comprises a substantially U-shaped cross section, wherein a top area of the U-shape is defined by a first wall and a second wall and configured to receive at least a portion of the first end of the at least one first pivot member and at least a portion of the first end of the at least one second pivot member therebetween, wherein the at least one pin directly or indirectly connects at least one of the plurality of first pivot members between the first wall and the second wall.

15. The fall protection device of claim 1, wherein at least a portion of the at least one first pivot member and/or the at least one second pivot member is connected between two second lateral members.

16. The fall protection device of claim 1, wherein the at least one slot extends through at least a portion of the first end of the at least one first pivot member.

17. The fall protection device of claim 1, wherein at least a portion of the first pivot member and/or the second pivot member comprises at least one of the following: projections, indentations, ribs, slots, grooves, a coating, a friction material, knurling, or any combination thereof.

18. The fall protection device of claim 1, wherein the at least one slot is at least one of the following: shaped, sized, oriented, or any combination thereof, to facilitate the movement or urging of at least a portion of the first end of the at least one first pivot member and/or the first end of the at least one second pivot member into contact with the cable to brake or stop the movement of the fall protection device.

19. The fall protection device of claim 1, further comprising at least one pin extending through and configured to slide along the at least one slot, wherein the at least one pin has at least one of the following cross sections: circular, triangular, square, or any combination thereof.

20. A fall protection device for use with a generally vertically-extending cable, comprising:
an articulating frame comprising:
(i) a plurality of members;
(ii) a channel configured to receive and retain the cable; and
(iii) an attachment member opening extending through at least a portion of the articulating frame and configured to facilitate attachment of an attachment member to the fall protection device;
wherein, when the frame is articulated in a generally downward direction, and at a specified point, at least a portion of at least one of the plurality of members contacts the cable and brakes or stops movement of the fall protection device; and
wherein, when the frame is articulated in a generally upward direction, and at a specified point, at least a portion of at least one of the plurality of members contacts the cable and brakes movement of the fall protection device.

* * * * *